US012804452B2

(12) United States Patent
Patil et al.

(10) Patent No.: US 12,804,452 B2
(45) Date of Patent: Nov. 17, 2026

(54) SMART MAC DOWNLINK TRANSPORT BLOCK HANDLING

(71) Applicant: Apple Inc., Cupertino, CA (US)

(72) Inventors: Vinay Rajkumar Patil, San Jose, CA (US); Amit Dubey, San Diego, CA (US); Darshan Bharat Ashar, Cupertino, CA (US); Vijay Venkataraman, San Jose, CA (US)

(73) Assignee: Apple Inc., Cupertino, CA (US)

( * ) Notice: Subject to any disclaimer, the term of this patent is extended or adjusted under 35 U.S.C. 154(b) by 640 days.

(21) Appl. No.: 18/304,486

(22) Filed: Apr. 21, 2023

(65) Prior Publication Data

US 2024/0357415 A1 Oct. 24, 2024

(51) Int. Cl.

| | |
|---|---|
| ***H04W 28/02*** | (2009.01) |
| ***H04W 28/06*** | (2009.01) |
| ***H04W 76/30*** | (2018.01) |
| ***H04W 76/34*** | (2018.01) |

(52) U.S. Cl.

CPC ... *H04W 28/0252* (2013.01); *H04W 28/0278* (2013.01); *H04W 28/06* (2013.01); *H04W 76/30* (2018.02); *H04W 76/34* (2018.02)

(58) Field of Classification Search

None

See application file for complete search history.

(56) References Cited

U.S. PATENT DOCUMENTS

| | | | | |
|---|---|---|---|---|
| 2004/0085905 | A1* | 5/2004 | Lim | H04Q 11/0062 370/535 |
| 2008/0232251 | A1* | 9/2008 | Hirayama | H04L 47/2433 370/235 |
| 2019/0297555 | A1 | 9/2019 | Hampel et al. | |
| 2019/0306745 | A1* | 10/2019 | Kim | H04W 28/0278 |
| 2020/0296629 | A1 | 9/2020 | Forsman et al. | |
| 2021/0067281 | A1* | 3/2021 | Sarkis | H04L 1/1822 |
| 2022/0147253 | A1* | 5/2022 | Sajeepa | G06F 3/065 |
| 2023/0016351 | A1 | 1/2023 | Liu | |

* cited by examiner

*Primary Examiner* — Jutai Kao

(74) *Attorney, Agent, or Firm* — Eschweiler & Potashnik, LLC; Matthew Glause

(57) ABSTRACT

Techniques described herein include solutions for adaptively handling transport blocks (TBs) based on current memory backpressure conditions. In some aspects, a user equipment (UE) monitors a memory backpressure associated with an application processor of the UE. A baseband processor of the UE may receive a plurality of TBs (e.g., from a base station). Based on the memory backpressure, the UE may choose to only decode TBs having certain prioritized data types, and drop or ignore the remaining TBs. For example, the UE may drop certain low priority TBs destined for the application processor, which alleviates the memory backpressure by allowing the application processor to process piled up TBs causing the memory backpressure. In addition, this frees memory in the baseband processor, allowing the UE to handle high priority TBs used for essential functions (e.g., connection and synchronization with the network) in high memory backpressure scenarios.

20 Claims, 10 Drawing Sheets

SMART MAC DOWNLINK TRANSPORT BLOCK HANDLING

FIELD

This disclosure relates to wireless communication networks including techniques for handling transport blocks within wireless networks.

BACKGROUND

Wireless communication networks may include user equipments (UEs), base stations, and/or other types of wireless devices capable of communicating with one another. A UE may comprise multiple processors, such as a baseband processor and an application processor, which are used to perform various functions of the UE.

BRIEF DESCRIPTION OF THE DRAWINGS

The following detailed description refers to the accompanying drawings. Like reference numbers in different drawings may identify the same or similar features, elements, operations, etc. Additionally, the present disclosure is not limited to the following description as other implementations may be utilized, and structural or logical changes made, without departing from the scope of the present disclosure.

DETAILED DESCRIPTION

Figure 1:
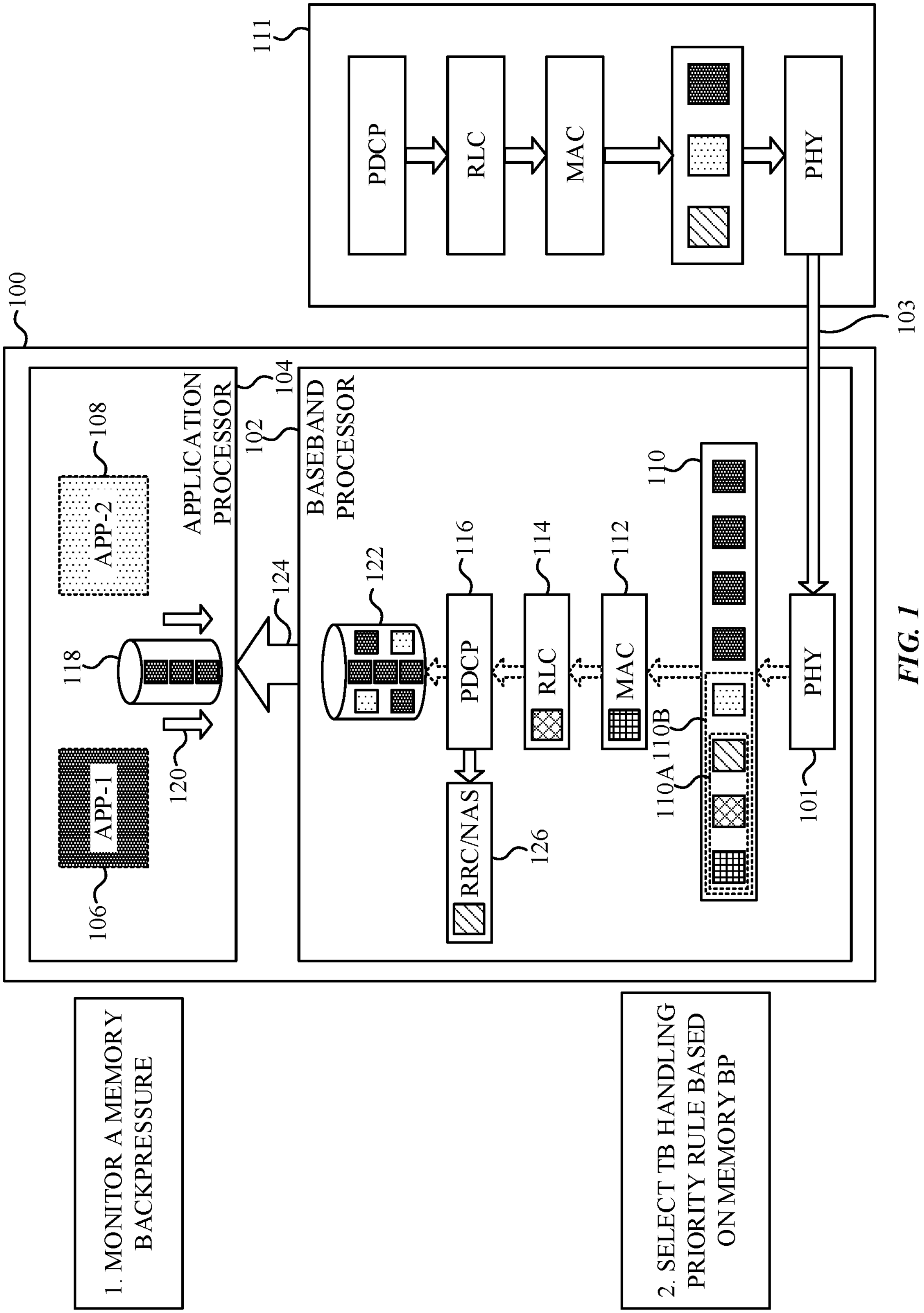
FIG. 1 is a schematic diagram illustrating smart medium access control (MAC) transport block (TB) handling in accordance with some aspects of the present disclosure.

The following detailed description refers to the accompanying drawings. Like reference numbers in different drawings may identify the same or similar features, elements, operations, etc. Additionally, the present disclosure is not limited to the following description as other implementations may be utilized, and structural or logical changes made, without departing from the scope of the present disclosure.

For wireless communication, a user equipment (UE) is configured to communicate with other devices such as communicating with various base stations using uplink (UL) or downlink (DL), or communicating with other UEs using sidelink (SL). Using DL as an example, the UE receives data from a base station at the physical layer, for example, on a physical downlink shared channel (PDSCH). The PDSCH may be decoded according to a modulation and coding scheme (MCS) to obtain one or more transport blocks (TBs). The TBs are then passed upwards from the physical layer to the medium access control (MAC) layer for further processing. The TBs carry different types of data that need to be transferred, such as control information to provide synchronization, access, and manage the radio communications link, and/or user data for various applications such as voice, web browsing, video, gaming, etc.

A UE may comprise multiple processors used for performing various functions. A baseband processor is used for performing radio related functions (e.g., signal modulation, encoding/decoding, etc.) and an application processor is used for general computing (e.g., running operating systems, applications, games, etc.). When the UE receives application data (e.g., on the PDSCH) it is decoded/processed at the baseband processor before being passed to the application processor. In certain scenarios, the application processor may process the application data at a slower rate than the application data is being received from the baseband processor. As a result, the application data starts to pile up in data queues to await processing, causing the application processor to eventually run out of memory. This effect, referred to as memory backpressure, propagates to the baseband processor, leaving the baseband processor with little to no free memory to operate. Since the baseband processor is forced to operate using a limited amount of memory, traffic through the baseband processor is indifferently limited or suspended, causing call drops, baseband instability/crashes, and an overall poor user experience.

In view of the above, the present disclosure provides techniques for smart MAC TB handling of a UE by prioritizing certain category of TBs over others in the presence of high memory backpressure, such that some TBs with relatively high priorities are processed while other TBs with relatively low priorities are dropped to save capacity of the baseband processor. Specifically, in some aspects, the UE is configured to, upon detecting a memory backpressure generated by an application processor exceeding a selective handling threshold, operate in a selective MAC TB handling mode. The selective MAC TB handling mode may include, according to a priority rule, processing data traffic necessary for maintaining a connection, such as MAC control elements (CEs), radio link control (RLC) control protocol data units (PDUs), and signaling radio bearer (SRB) traffic for radio resource control (RRC) and non-access stratum (NAS) layers, and/or disregarding other types of MAC TBs such as application data with low priority and high throughput. As a result, RRC connection and synchronization with the base station may be maintained, and the baseband operation may remain stable to maintain essential services. In some further aspects, the UE may apply different priority rules, based on different thresholds of memory backpressure conditions, and thus a balance between maintaining reliable baseband stability and improving throughput can be achieved by different phases of the selective MAC TB handling mode. Additional aspects and details of the disclosure are further described below with reference to figures.

FIG. 1 illustrates an example of a UE 100 comprising a baseband processor 102 and an application processor 104 to performing smart MAC TB handling. In some aspects, the application processor 104 is configured to execute one or more applications. In the illustrated example, the application processor 104 is configured to execute a first application 106 and a second application 108. The baseband processor 102 receives data from a base station 111 at a physical layer 101 over a connection 103. The data may be received, for example, over a PDSCH. The data is decoded at the physical layer 101 (e.g., according to MCS) to obtain TBs 110, which includes TBs carrying data associated with the first application 106 and the second application 108. The TBs 110 further include TBs carrying SRB traffic, RLC control PDUs, and MAC CEs.

The TBs 110 are passed to different protocol layers depending on a data type carried by the TBs. For example, TBs carrying MAC CEs may be passed to a MAC layer 112, where they are processed by the baseband processor 102. TBs carrying RLC control PDUs may be passed through the MAC layer 112, to an RLC layer 114, where they are processed. TBs carrying SRB traffic may be passed through the MAC layer 112, through the RLC layer 114, through a PDCP layer 116, and to an RRC/NAS layer 126, where they are processed.

The one or more applications may each have a different data priority and/or data throughput. In some aspects, the TBs associated with the first application 106 and the second application 108 are sent through the MAC layer 112, the RLC layer 114, and the PDCP layer 116 before being sent to the application processor 104. In the illustrated example, the data traffic associated with the first application 106 is low priority, high throughput data traffic. The first application 106 may be, for example, a video streaming application. As further illustrated, data traffic associated with the second application 108 is high priority, low throughput data traffic.

In certain scenarios, the application processor 104 may process application data at a slower rate than the application data is being received by the baseband processor 102. In such scenarios, an input data queue 118 of the application processor 104 may become bloated (e.g., by the high throughput data traffic), such that there is little to no space (e.g., memory) left in the input data queue 118, which causes a memory backpressure 120 to form. The effects of the memory backpressure 120 propagate to an output data queue 122 of the baseband processor 102, leaving the baseband processor 102 with little to no free memory to operate. The memory backpressure 120 could be caused by data traffic being sent by the baseband processor 102 to the application processor 104 in "bursts", causing the data queue 118 to become overloaded during the bursts of data. This may occur, for example, in sub-optimal radio frequency (RF) conditions, where the UE 100 may be unable to receive data for a period of time, and subsequently receives a large "burst" of data to "catch-up". Additionally or alternatively, a slow application drain rate and/or a slow interconnect 124 between the baseband processor 102 and the application processor 104 may also cause the memory backpressure 120 to form. In the example of FIG. 1, the high throughput data associated with the first application 106 causes the memory backpressure 120 to occur.

As explained above, the memory backpressure 120 causes the baseband processor 102 to operate using a limited amount of memory. As a result, the baseband processor 102 does not have memory available to continue decoding the TBs 110, causing traffic through the MAC layer 112, the RLC layer 114, the PDCP layer 116, and the RRC/NAS layer 126 to be limited or suspended. Suspending traffic indifferently through such layers can have a variety of undesirable effects on the UE 100, such as call drops, baseband instability/crashes, and an overall poor user experience. In such scenarios, it is important to continue processing high priority TBs so that the baseband remains stable and connected to provide UE essential services.

In some aspects, the UE 100 monitors a memory backpressure (e.g., the memory backpressure 120). Based on the memory backpressure, the UE 100 may choose from multiple priority rules to prioritize different types of TBs and adapt to current memory backpressure conditions. The priority rule may include, for example, prioritizing TBs 110A or TBs 110B. When memory backpressure is high, the UE 100 may prioritize data traffic necessary for maintaining a connection with the base station 111. As memory backpressure decreases, the UE 100 may start to prioritize additional data traffic (e.g., application data) based on data priority and/or throughput. For example, the UE may choose to prioritize high priority application data traffic and/or low throughput application data traffic. Further details of selective MAC TB handling will now be described with reference to the following figures.

Figure 2:
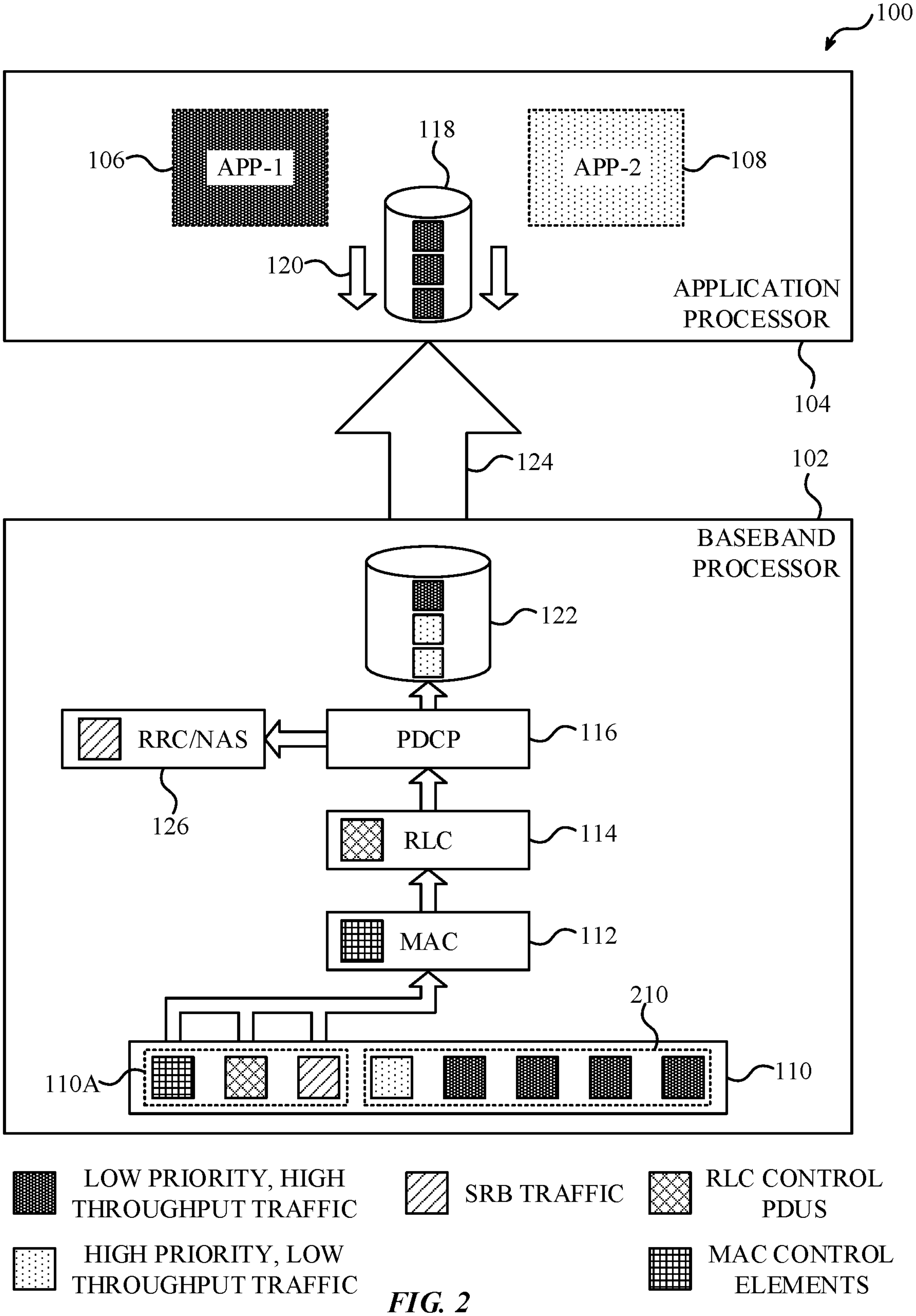
FIG. 2 is a schematic diagram illustrating a selective MAC TB handling mode in accordance with some aspects of the present disclosure.

FIG. 2 illustrates an example of a UE 100 operating in a selective MAC TB handling mode in accordance with some aspects of the present disclosure. In some aspects, the baseband processor 102 operates in the selective MAC TB handling mode in response to a detecting that a memory build up due to backpressure (e.g., the memory backpressure 120) exceeds a selective handling threshold. In some aspects, operating in the selective MAC TB handling mode includes decoding and/or processing data (e.g., TBs) from a set of prioritized data types, and dropping data not in the set of prioritized data types. The UE 100 may receive the MAC TBs, for example, from a base station.

In the example of FIG. 2, the set of prioritized data types includes MAC CEs, RLC control PDUs, and SRB traffic for RRC and NAS layers, such that data types of the TBs 110A are included in the set of prioritized data types, and data types of TBs 210 are not included in the set of prioritized data types. As a result, the baseband processor 102 decodes TBs 110A, and drops (e.g., ignores or discards) TBs 210. The TBs 210 may correspond to application data traffic, for example, data traffic associated with the first application 106 and/or the second application 108. The UE 100 sends hybrid automatic repeat request (HARQ) acknowledgement (ACK) or negative acknowledgment (NACK) messages to the base station for the decoded TBs, and does not send HARQ ACK/NACK messages for the dropped/ignored TBs.

In some aspects, the set of prioritized data types are used to maintain a connection between the UE 100 and a network. The network may, for example, comprise one or more base stations, and the UE 100 may connect to the network using one or more of the base stations.

In some aspects, TBs carrying MAC CEs are prioritized and processed in presence of a high backpressure. MAC CEs may be used for synchronization between the UE 100 and the network, and/or for enabling/disabling critical capabilities such as discontinuous reception (DRX), secondary cells (SCells), etc. Dropping TBs for MAC CEs and failing to provide corresponding HARQ feedback to the network can cause de-sync between the UE 100 and the network. In such scenarios, synchronization should be re-established between the UE 100 and the network before any further communication, which leads to reduced performance due to increased signaling overhead. Thus, MAC CEs should be prioritized in order to achieve optimal performance. In some aspects, the prioritized data types include critical MAC CEs. Critical MAC CEs may, for example, be used for maintaining a connection between the UE 100 and the network. In one example, MAC CEs including index 47 "Recommended bit rate" are defined as non-critical MAC CEs, and are not defined as a prioritized data type. Since the destination for MAC CEs including index 47 "Recommended bit rate" is the application processor 104, suppressing it may be desirable during the selective MAC TB handling mode, in order to avoid further increasing the memory backpressure 120. A MAC CE may be decoded, for example, by parsing a logical channel (LCH) identity (ID) (LCID) value in a sub-header of the MAC CE. The LCID values may be used to identify prioritized or non-prioritized data types.

In some aspects, TBs carrying SRB traffic are prioritized and processed in presence of a high backpressure. SRB traffic may contain essential signaling related information used by the UE 100 to maintain a connection with the network. In order to maintain the connection during the selective MAC TB handling mode and reduce the need for connection re-establishment, SRB traffic may be included in the prioritized data types. The SRB traffic may be accepted based on an LCID value in a MAC SDU header. The MAC SDU may, for example, be included in one or more TBs for SRB traffic. In some aspects, TBs with associated LCID values 1, 2, and 3 corresponding to SRB1, SRB2, and SRB3 respectively, are included in the set of prioritized data types. In the case of SRB3, which may be configured less frequently than SRB1 and SRB2, a MAC TB decoder may be made aware when SRB3 is configured in order to include LCID value 3 in the set of prioritized data types.

In some aspects, TBs carrying RLC control PDUs are prioritized and processed in presence of a high backpressure. RLC control PDUs in the DL direction may contain corresponding RLC ACKs for RLC PDUs transmitted in the UL direction, for example, RLC PDUs transmitted on an acknowledged mode (AM) bearer on a physical uplink shared channel (PUSCH). In cases such as an active UL data transfer, packets that are not acknowledged could keep piling up and create UL window stall, which exacerbates the problem of low available memory in the baseband processor 102. In order to remedy this issue, in some aspects, RLC control PDUs from all LCIDs are accepted during the selective MAC TB handling mode. If the LCID corresponds to an AM bearer, the RLC control PDUs may be parsed using a data/control (D/C) bit in an RLC header of the RLC control PDU.

By only accepting high priority TBs 110A, and dropping/ignoring the TBs 210, the negative effects of the memory backpressure 120 can be reduced. Since the TBs 210 (corresponding to application data traffic) are dropped in the selective MAC TB handling mode, the output data queue 122 can begin emptying, which reduces the memory backpressure 120. In addition, this frees up memory in the baseband processor 102 for processing high priority data traffic necessary for synchronization, maintaining RRC connection, etc. Freeing memory in the baseband processor 102 allows the prioritized data traffic to be decoded and passed through the MAC layer 112, RLC layer 114, PDCP layer 116, and RRC/NAS layer 126 to perform necessary functions of the UE.

Although operating in the selective MAC TB handling mode is advantageous in the presence of the memory backpressure 120, it may not be desirable to stay in indefinitely. Since the application related TBs are dropped in the selective MAC TB handling mode, application performance may be reduced. Further, the network could possibly penalize the UE (e.g., by terminating the connection) for ignoring application related TBs and not transmitting HARQ ACK/NACK. In order to provide optimal performance across a wide range of conditions, the UE 100 should detect current memory backpressure conditions and operate accordingly. In some aspects, this involves switching between the selective MAC TB handling mode and a "default" MAC TB handling mode based on a memory buildup in the baseband processor 102 due to the memory backpressure 120. In some aspects, the default MAC TB handling mode includes accepting all TBs, for example, as described with reference to FIG. 1. Further details regarding managing MAC TB handling modes will now be described with reference to FIG. 3.

Figure 3:
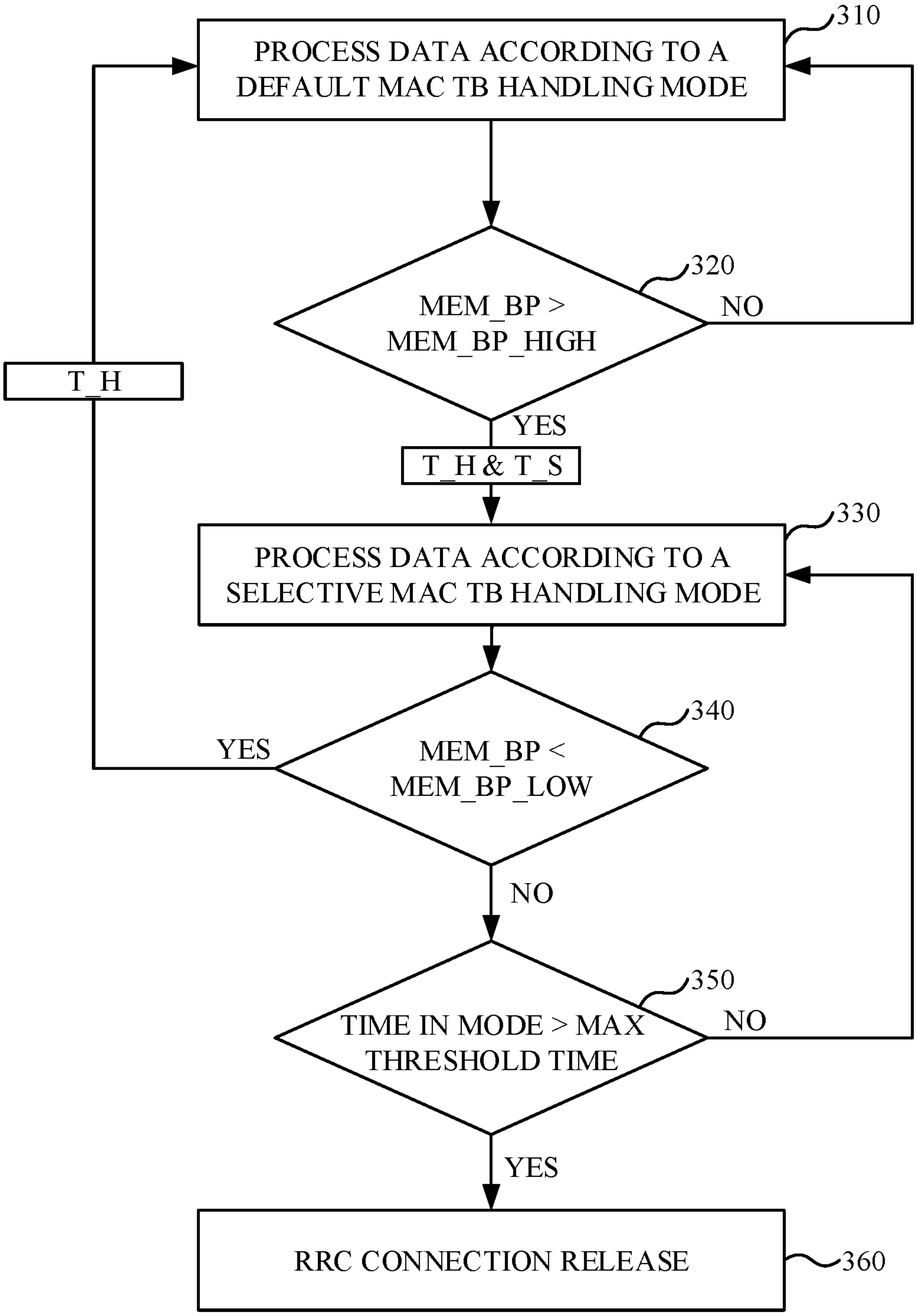
FIG. 3 is a logic flow for a user equipment (UE) to perform smart MAC TB handling in accordance with some aspects of the present disclosure.

FIG. 3 illustrates an example logic flow for a UE to perform smart MAC TB handling in accordance with some aspects of the present disclosure. In some aspects, the smart MAC TB handling includes switching between a selective MAC TB handling mode and a default MAC TB handling mode based on a memory buildup in a baseband processor. The UE may operate in the selective MAC TB handling mode temporarily in order to alleviate the memory backpressure from the application processor. Once the memory backpressure (and as a result, the memory buildup in the baseband) is reduced sufficiently, the UE may switch back to the default MAC TB handling mode, which includes accepting all types of TBs. The UE may be, for example, the UE 100 as previously described.

At act 310, the UE processes data according to a default MAC TB handling mode. In some aspects, the default MAC TB handling mode includes accepting/decoding all types of data (e.g., TBs), for example, as described with reference to FIG. 1. The data may be received, for example, from a base station (e.g., the base station 111) on a PDSCH.

At act 320, the UE checks if a memory buildup MEM_BP in the baseband processor due to backpressure from an application processor is greater than a first selective handling threshold MEM_BP_HIGH. The UE may be configured to track the memory buildup MEM_BP periodically, and the periodicity may be configurable. If MEM_BP is greater than MEM_BP_HIGH, then act 330 is performed. Otherwise, act 310 is performed. In some aspects, the value of MEM_BP_HIGH is chosen with the assumption that when MEM_BP is equal to MEM_BP_HIGH, the available baseband memory is sufficient to serve critical traffic (e.g., data traffic used for maintaining a connection between the UE and the base station). The value of MEM_BP_HIGH may be, for example, 80% of the total baseband modem memory.

At act 330, the UE processes data according to a selective MAC TB handling mode. In some aspects, the selective MAC TB handling mode includes processing control data, and ignoring application related data, for example, as described with reference to FIG. 2. The data may be received, for example, from the base station (e.g., on the PDSCH).

At act 340, the UE checks if MEM_BP is less than a default handling threshold MEM_BP_LOW. If MEM_BP is less than MEM_BP_LOW, then act 310 is performed. Otherwise, act 350 is performed. In some aspects, the value of MEM_BP_LOW is chosen with the assumption that when MEM_BP is equal to MEM_BP_LOW, the available baseband memory is sufficient to serve all classes of traffic. In some aspects, MEM_BP_LOW<MEM_BP_HIGH. The value of MEM_BP_LOW may be, for example, 70% of the total baseband modem memory.

At act 350, the UE checks if a time duration spent in the selective MAC TB handling mode is greater than a maximum threshold time. The maximum threshold time may be, for example, between 800 ms and 1000 ms. If the time duration exceeds the maximum threshold time, then an RRC connection release procedure is performed at act 360. If the time duration does not exceed the maximum threshold time, then act 330 is performed. As an example, a selective MAC TB handling mode timer T_S may be started upon entering the selective MAC TB handling mode (e.g., upon transitioning from act 320 to act 330), and the timer may be compared to the maximum threshold time at act 350. The network may choose to penalize the UE (e.g., by terminating connection) for remaining in the selective MAC TB handling mode for too long as a result of the UE failing to send HARQ ACK/NACK for application related TBs. Performing RRC connection release at act 360 allows the connection to be terminated in a controlled manner. Performing RRC connection release may include, for example, sending an RRC connection release message to the base station.

In some aspects, upon switching between default and selective MAC TB handling modes (e.g., upon transition from act 340 to act 310 or from act 320 to act 330), the UE starts a hysteresis timer T_H. The UE may be configured to remain in a current MAC TB handling mode (e.g., selective mode or default mode) until the hysteresis timer expires in order to avoid frequent transitions between MAC TB handling modes. The hysteresis timer may expire when it exceeds a maximum hysteresis threshold time. The maximum hysteresis threshold time may be, for example, between 50 ms and 100 ms. The hysteresis timer may be monitored periodically, or checked during each occasion of act 320 and/or act 340 to compare to the maximum hysteresis threshold time. In some aspects, a default maximum hysteresis threshold time is used when operating in the default MAC TB handling mode, and a selective maximum hysteresis threshold time is used when operating in the selective MAC TB handling mode. The default maximum hysteresis threshold time and the selective maximum hysteresis threshold time may be the same or different values.

Figure 4:
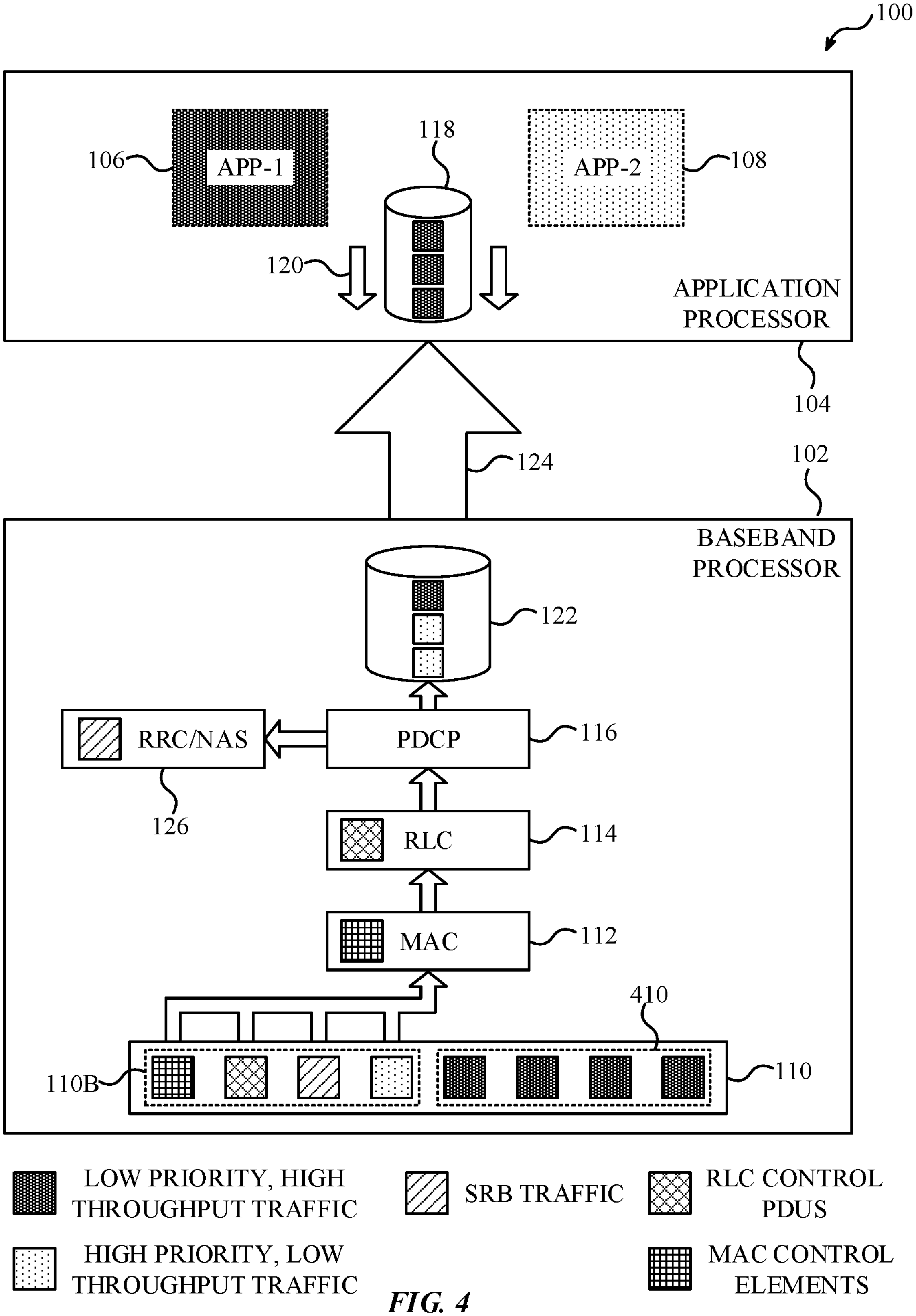
FIG. 4 is a schematic diagram illustrating a selective MAC TB handling mode in accordance with some aspects of the present disclosure.

FIG. 4 illustrates an example of a UE 100 operating in a selective MAC TB handling mode in accordance with some aspects of the present disclosure. FIG. 4 contains similarities to FIG. 2, but differs in that the set of prioritized data types additionally includes high priority data radio bearer (DRB) traffic, such that data types of TBs 110B are included in the set of prioritized data types, and data types of TBs 410 are not included in the set of prioritized data types. The high priority DRB traffic may include, for example, high priority data traffic for the second application 108. As a result, the baseband processor 102 decodes the TBs 110B and drops the TBs 410. The TBs 410 may include, for example, low priority data traffic for the first application 106.

In some aspects, a priority of DRB traffic is determined statically (e.g., at the time of bearer setup). For example, internet protocol (IP) multimedia subsystem (IMS) bearers and/or traffic associated with an ultra-reliable low latency communications (URLLC) network slice may be deemed as high priority DRB traffic.

In some additional or alternative aspects, a priority of DRB traffic is determined dynamically (e.g., in real-time during active data transfer). In some aspects, a layer 3 (L3) of the UE 100 dynamically determines if a DRB is high priority by observing the traffic received on the DRB, and communicates the determination to a layer 2 (L2). For example, bearers receiving only transmission control protocol (TCP) ACKs within a certain time window may be deemed as high-priority DRB traffic, while bearers receiving high throughput user datagram protocol (UDP) or file transfer protocol (FTP) traffic may be determined as low-priority DRB traffic. Additionally or alternatively, DRBs receiving data traffic for high priority services (e.g., iMessage, FaceTime, etc.) may be considered high priority.

In some aspects, the selective MAC TB handling mode of FIG. 4 is used in place of the selective MAC TB handling mode of FIG. 2 at act 330 of FIG. 3. However, the selective MAC TB handling mode of FIG. 4 may also be used in addition to the selective MAC TB handling mode of FIG. 2. For example, FIG. 2 corresponds to a “phase 1” selective MAC TB handling mode, and FIG. 4 corresponds to a “phase 2” selective MAC TB handling mode. Based on the value of MEM_BP, the UE 100 may choose to operate in the phase 1 selective MAC TB handling mode, the phase 2 selective MAC TB handling mode, or the default MAC TB handling mode.

Figure 5:
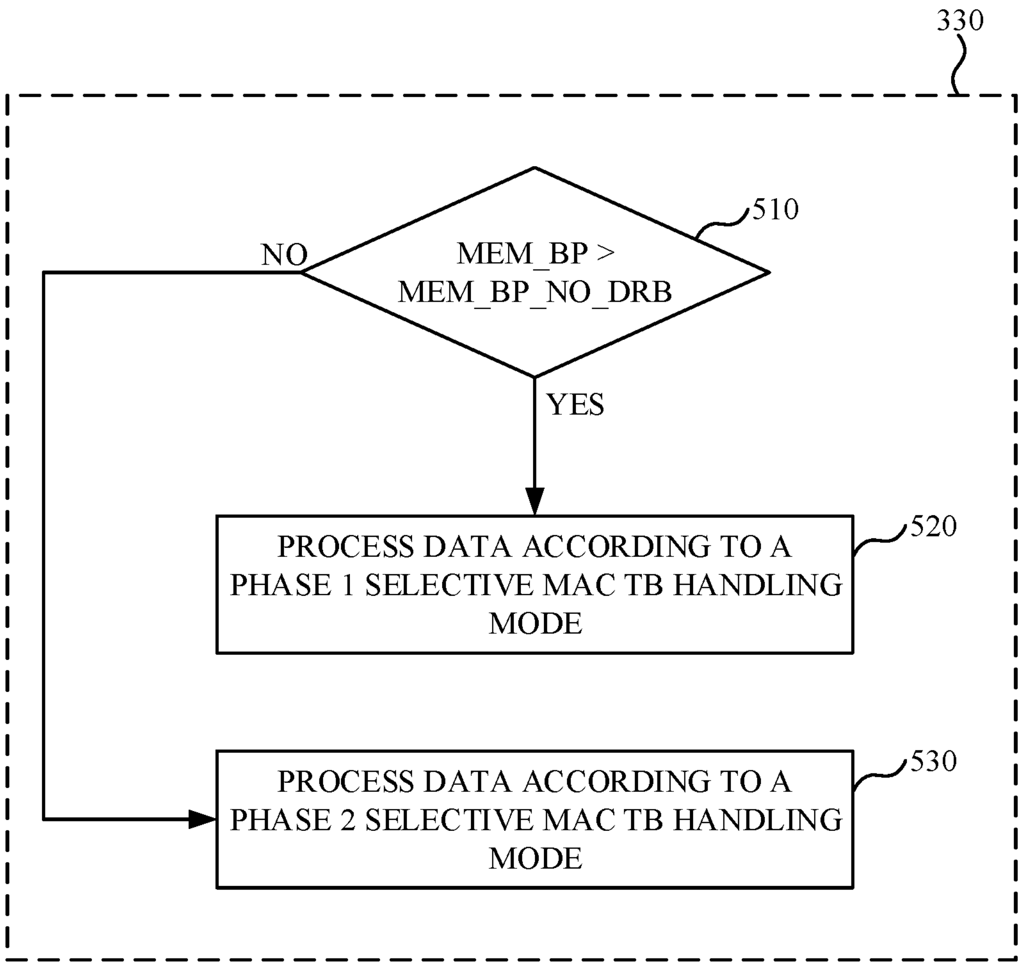
FIG. 5 is a logic flow for a UE operating in a selective MAC TB handling mode in accordance with some aspects of the present disclosure.

FIG. 5 illustrates an example logic flow for a UE operating in a selective MAC TB handling mode in accordance with some aspects of the present disclosure. In some aspects, the UE operates in phase 1 or phase 2 of the selective MAC TB handling mode, based on the value of MEM_BP. The UE may be, for example, the UE 100 as previously described. In some aspects, FIG. 5 illustrates further details of act 330 as described with reference to FIG. 3.

At act 510, the UE checks if MEM_BP (e.g., as in FIG. 3) is greater than a second selective handling threshold MEM_BP_NO_DRB. If MEM_BP is greater than MEM_BP_NO_DRB, then act 520 is performed. Otherwise, act 530 is performed. In some aspects, MEM_BP_LOW<MEM_BP_HIGH<MEM_BP_NO_DRB. The value of MEM_BP_NO_DRB may be, for example, 90% of the total baseband modem memory.

At act 520, the UE processes data according to a phase 1 selective MAC TB handling mode which may, for example, correspond to the MAC TB handling mode of FIG. 2.

At act 530, the UE processes data according to a phase 2 selective MAC TB handling mode which may, for example, correspond to the MAC TB handling mode of FIG. 4.

Although only 2 phases of selective MAC TB handling are used in the present example, it is appreciated that more or fewer phases may be used to achieve better performance across a wide range scenarios. In some aspects, the UE selects a priority rule (e.g., from a plurality of priority rules) that specifics which types of TBs to prioritize. Based on the priority rule, the UE may process and drop TBs accordingly. The priority rule may be chosen, for example, based on the value of MEM_BP.

Figure 6:
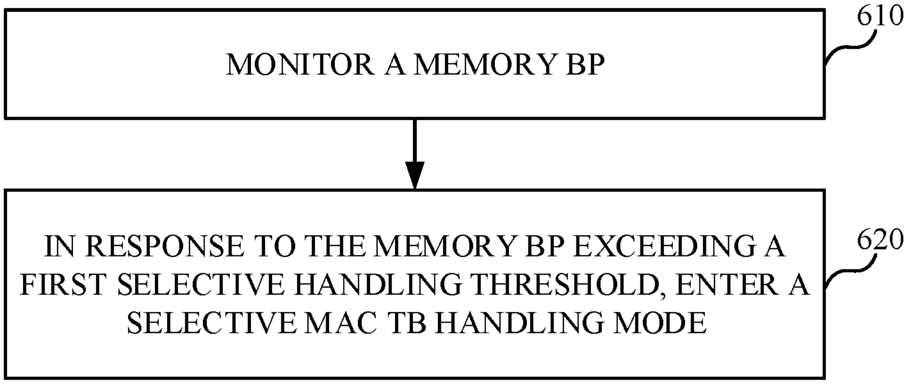
FIGS. 6-8 are flow diagrams for a UE to perform smart MAC TB handling in accordance with some aspects of the present disclosure.
Figure 7:
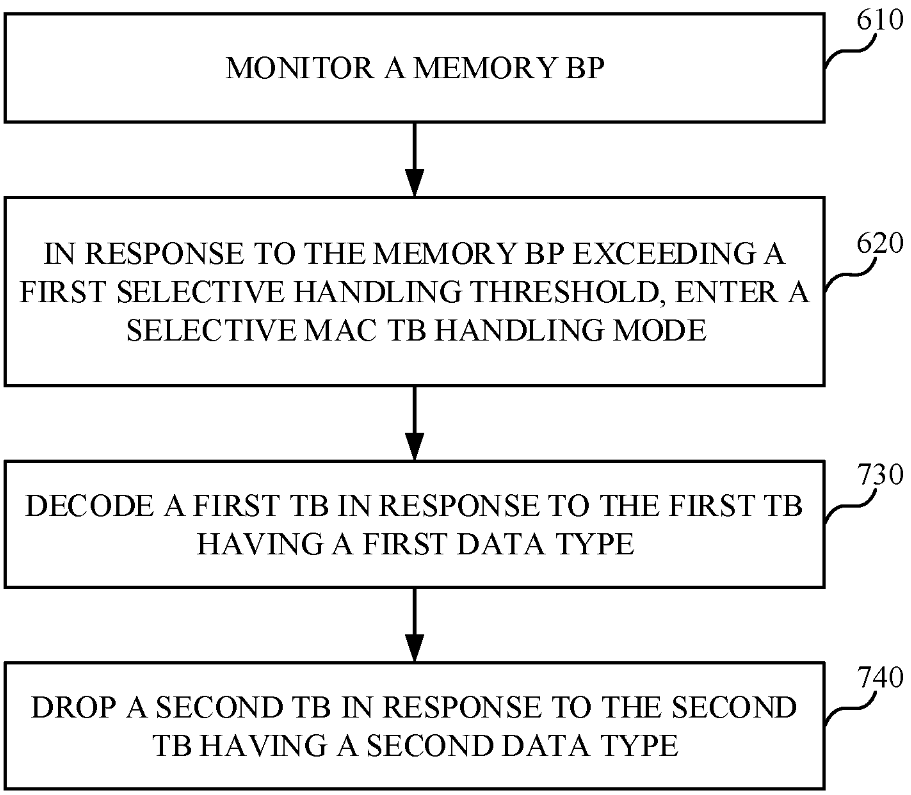

FIGS. 6-7 illustrate example flow diagrams for a UE to perform smart MAC TB handling in accordance with some aspects of the present disclosure. The UE may be, for example, the UE 100 as previously described.

At act 610, the UE monitors a memory backpressure. In some aspects, the memory backpressure is associated with an application processor, as previously described. The UE may, for example, be configured to track the memory backpressure periodically, where the periodicity of the tracking is configurable.

At act 620, the UE enters a selective MAC TB handling mode in response to the memory backpressure exceeding a first selective handling threshold. The selective MAC TB handling mode may, for example, include the selective MAC TB handling mode of FIG. 2, FIG. 4, and/or FIG. 5.

At act 730, the UE decodes a first TB in response to the first TB having a first data type. The first TB may be received, for example, from a base station. In some aspects, the first data type is in a set of prioritized data types, and the UE decodes the first TB in response to the first data type being in the set of prioritized data types. The set of prioritized data types may be used to maintain a connection between the UE and the base station.

At act 740, the UE drops a second TB in response to the second TB having a second data type. The second TB may be received, for example, from the base station. In some aspects, the second data type is not in the set of prioritized data types, and the UE drops the second TB in response to the second data type not being in the set of prioritized data types.

Figure 8:
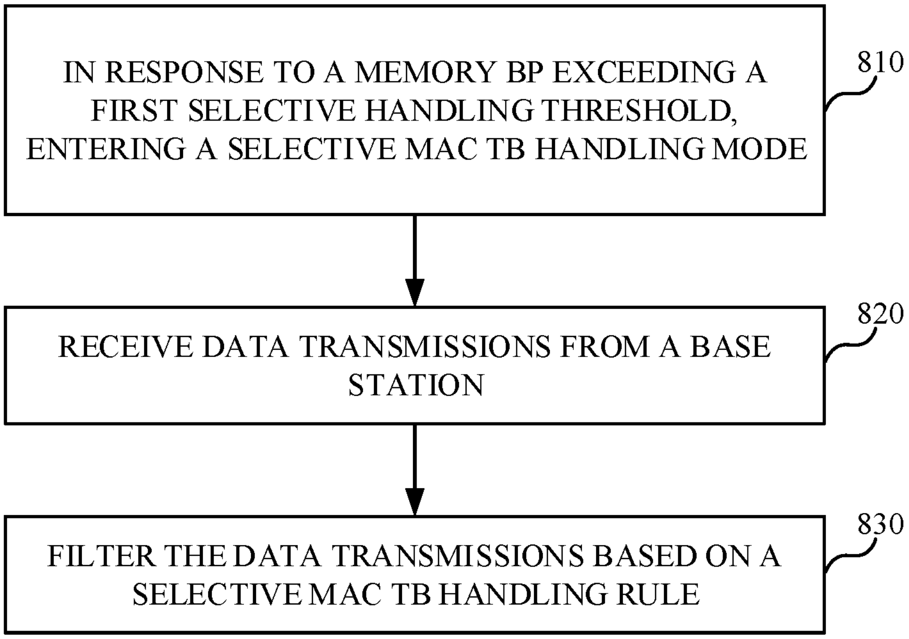

FIG. 8 illustrates an example flow diagram for a UE to perform smart MAC TB handling in accordance with some aspects of the present disclosure.

At act 810, the UE enters a selective MAC TB handling mode in response to a memory backpressure (e.g., a memory backpressure associated with an application processor) exceeding a first selective handling threshold. The UE may, for example, be configured to monitor the memory backpressure periodically as described throughout the present disclosure.

At act 820, the UE receives one or more data transmissions from a base station. A data transmission of the one or more data transmissions may, for example, comprise one or more MAC TBs.

At act 830, the UE filters the data transmission based on a selective MAC TB handling rule. The selective MAC TB handling rule may include, for example, selectively accepting a first type of TBs and discarding a second type of TBs (e.g., as described with reference to FIG. 2 and/or FIG. 4).

Figure 9:
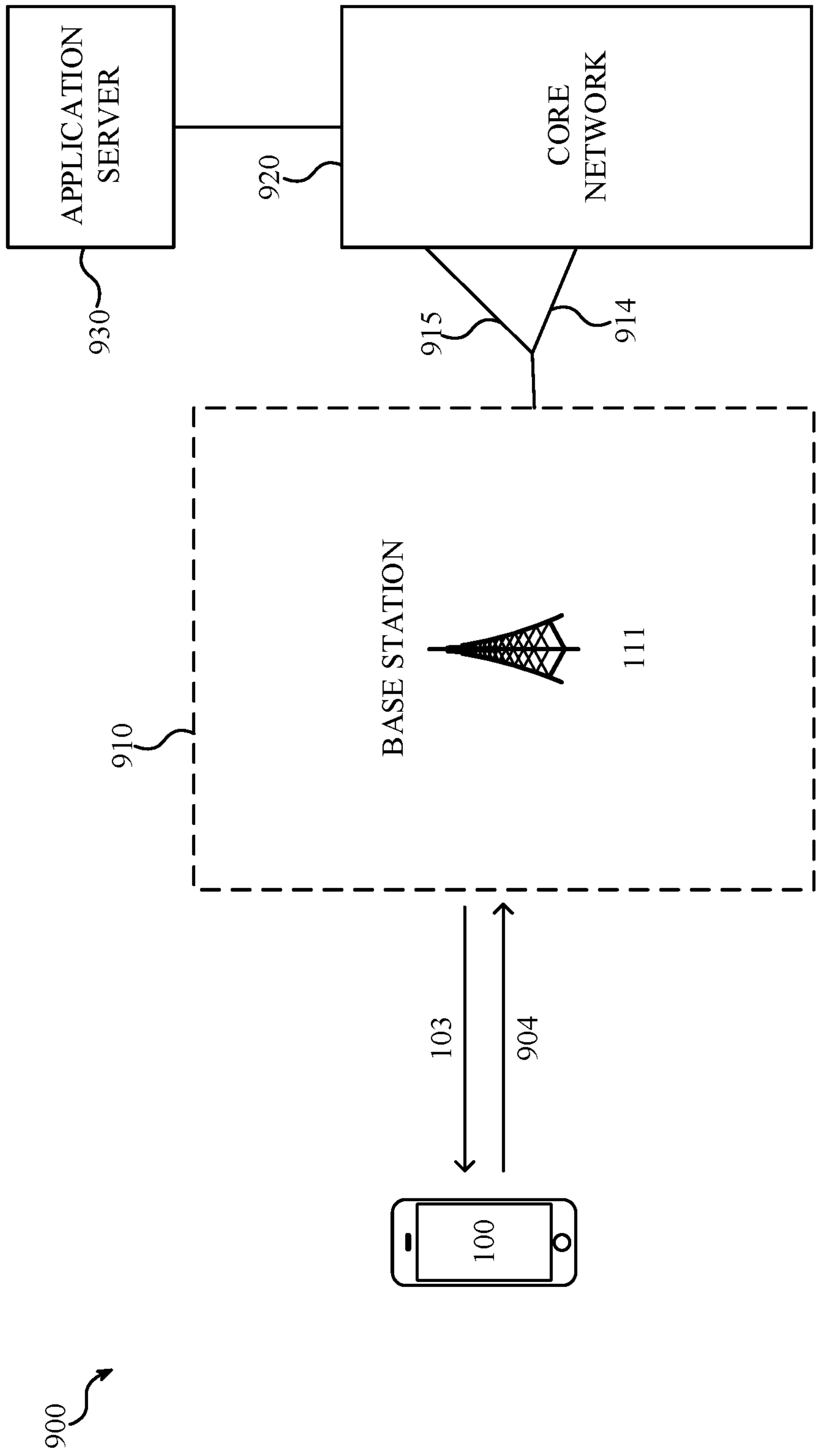
FIG. 9 is a block diagram illustrating a wireless network including a UE configured to perform smart MAC TB handling in accordance with some aspects of the present disclosure.

FIG. 9 illustrates an example network 900 in accordance with some aspects of the present disclosure. The example network 900 may include one or more UEs 100, a radio access network (RAN) 910, a core network (CN) 920, and an application server 930. The RAN 910 may comprise one or more base stations 111, which may be consistent with the base station described throughout the present disclosure. The UEs 100 may use connections (or channels) 103 and 904 for DL and UL respectively.

The UE 100 may be configured to perform smart MAC TB handling, as described throughout the present disclosure. For example, the UE 100 may receive MAC TBs from the base station 111 using the connection 103. Based on current memory backpressure conditions, the UE 100 may choose to operate in various phases of a selective MAC TB handling mode or a default MAC TB handling mode, as previously described. In some aspects, if the UE 100 remains in the selective MAC TB handling mode for a maximum threshold time, the UE 100 sends an RRC connection release to the base station 111 using the connection 904.

The systems and devices of example network 900 may operate in accordance with one or more communication standards, such as 2nd generation (2G), 3rd generation (3G), 4th generation (4G) (e.g., long-term evolution (LTE)), and/or 5th generation (5G) (e.g., new radio (NR)) communication standards of the 3rd generation partnership project (3GPP). Additionally, or alternatively, one or more of the systems and devices of example network 900 may operate in accordance with other communication standards and protocols discussed herein, including future versions or generations of 3GPP standards (e.g., sixth generation (6G) standards, seventh generation (7G) standards, etc.), institute of electrical and electronics engineers (IEEE) standards (e.g., wireless metropolitan area network (WMAN), worldwide interoperability for microwave access (WiMAX), etc.), and more.

In some aspects, the RAN 910 can be a next generation (NG) RAN or a 5G RAN, an evolved-UMTS Terrestrial RAN (E-UTRAN), or a legacy RAN, such as a UTRAN or GERAN. As used herein, the term "NG RAN" or the like can refer to a RAN 910 that operates in an NR or 5G system, and the term "E-UTRAN" or the like can refer to a RAN 910 that operates in an LTE or 4G system.

In some aspects, the core network (CN) 920 can be a 5GC (referred to as "5GC 920" or the like), and the RAN 910 can be connected with the CN 920 via two parts, a Next Generation (NG) user plane (NG-U) interface 914, which carries traffic data between the RAN nodes and a User Plane Function (UPF), and the S1 control plane (NG-C) interface 915, which is a signaling interface between the RAN nodes and Access and Mobility Management Functions (AMFs).

In some aspects, the application server 930 is used to support one or more applications of the UE 100 (e.g., the first application 106 and/or the second application 108 of FIG. 1). For example, the application server 930 may be used for server side processing of the application(s), and may generate application data that is ultimately received by the UE 100 (e.g., over a PDSCH using connection 103).

As shown, the UEs 100 may include smartphones (e.g., handheld touchscreen mobile computing devices connectable to one or more wireless communication networks). Additionally, or alternatively, the UEs 100 may include other types of mobile or non-mobile computing devices capable of wireless communications, such as personal data assistants (PDAs), pagers, laptop computers, desktop computers, wireless handsets, etc. In some implementations, the UEs 100 may include internet of things (IoT) devices (or IoT UEs) that may comprise a network access layer designed for low-power IoT applications utilizing short-lived UE connections. Additionally, or alternatively, an IoT UE may utilize one or more types of technologies, such as machine-to-machine (M2M) communications or machine-type communications (MTC) (e.g., to exchanging data with an MTC server or other device via a public land mobile network (PLMN)), proximity-based service (ProSe) or device-to-device (D2D) communications, sensor networks, IoT networks, and more. Depending on the scenario, an M2M or MTC exchange of data may be a machine-initiated exchange, and an IoT network may include interconnecting IoT UEs (which may include uniquely identifiable embedded computing devices within an Internet infrastructure) with short-lived connections. In some scenarios, IoT UEs may execute background applications (e.g., keep-alive messages, status updates, etc.) to facilitate the connections of the IoT network.

Figure 10:
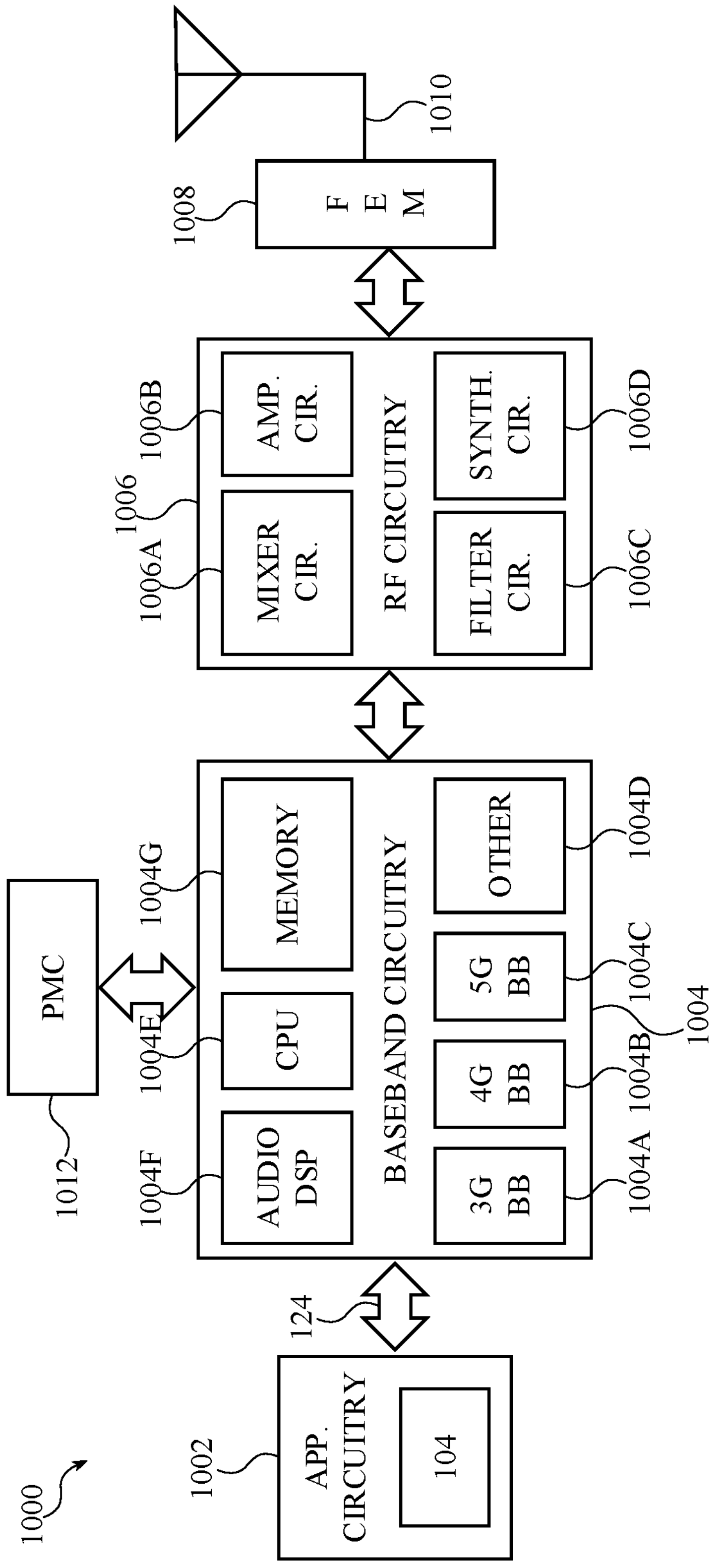
FIG. 10 is a block diagram illustrating a device that can be employed to perform smart MAC TB handling in accordance with some aspects of the present disclosure.

FIG. 10 is a diagram illustrating example components of a device 1000 that can be employed in accordance with some aspects of the present disclosure. In some aspects, the device 1000 can include application circuitry 1002, baseband circuitry 1004, RF circuitry 1006, front-end module (FEM) circuitry 1008, one or more antennas 1010, and power management circuitry (PMC) 1012 coupled together at least as shown. The components of the illustrated device 1000 can be included in a UE or a RAN node such as the UE 100 or the base station 111 as described, for example, with reference to FIG. 9 and throughout the present disclosure. The UE 100 may be configured to perform smart MAC TB handling, as described throughout the present disclosure. In some implementations, the device 1000 can include fewer elements (e.g., a RAN node may not utilize application circuitry 1002 and instead include a processor/controller to process IP data received from a CN, which may be a 5GC or an Evolved Packet Core (EPC)). In some implementations, the device 1000 can include additional elements such as, for example, memory/storage, display, camera, sensor (including one or more temperature sensors, such as a single temperature sensor, a plurality of temperature sensors at different locations in device 1000, etc.), or input/output (I/O)

interface. In other implementations, the components described below can be included in more than one device (e.g., said circuitries can be separately included in more than one device for Cloud-RAN (C-RAN) implementations).

The application circuitry 1002 can include one or more application processors 104, which may be consistent with the application processor 104 of FIGS. 1, 2, and 4. For example, one or more application processors 104 include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 1000. In some implementations, the one or more processors 104 of can process IP data packets received from an EPC.

The baseband circuitry 1004 can include circuitry such as, but not limited to, one or more single-core or multi-core processors. The baseband circuitry 1004 can include one or more baseband processors or control logic to process baseband signals received from a receive signal path of the RF circuitry 1006 and to generate baseband signals for a transmit signal path of the RF circuitry 1006. Baseband circuitry 1004 can interface with the application circuitry 1002 using an interconnect 124 for generation and processing of the baseband signals and for controlling operations of the RF circuitry 1006. In some implementations, the baseband circuitry 1004 can include a 3G baseband processor 1004A, a 4G baseband processor 1004B, a 5G baseband processor 1004C, or other baseband processor(s) 1004D for other existing generations, generations in development or to be developed in the future (e.g., 2G, 6G, etc.).

The baseband circuitry 1004 (e.g., one or more of baseband processors 1004A-D) can handle various radio control functions that enable communication with one or more radio networks via the RF circuitry 1006. In other implementations, some or all of the functionality of baseband processors 1004A-D can be included in modules stored in the memory 1004G and executed via a Central Processing Unit (CPU) 1004E. The radio control functions can include, but are not limited to, signal modulation/demodulation, encoding/decoding, radio frequency shifting, etc. In some implementations, the baseband circuitry 1004 can include one or more audio digital signal processor(s) (DSP) 1004F.

In some aspects, one or more of the baseband processors 1004A-1004G, or the baseband circuitry 1004 as a whole, may represent the baseband processor 102 as described with reference to FIGS. 1, 2, 4, and throughout the present disclosure. During operation, a memory backpressure may form at the application processor 104 and act on the baseband circuitry 1004 through the interconnect 124, as previously described.

RF circuitry 1006 can enable communication with wireless networks using modulated electromagnetic radiation through a non-solid medium. In various implementations, the RF circuitry 1006 can include switches, filters, amplifiers, etc. to facilitate the communication with the wireless network. RF circuitry 1006 can include a receive signal path which can include circuitry to down-convert RF signals received from the FEM circuitry 1008 and provide baseband signals to the baseband circuitry 1004. RF circuitry 1006 can also include a transmit signal path which can include circuitry to up-convert baseband signals provided by the baseband circuitry 1004 and provide RF output signals to the FEM circuitry 1008 for transmission.

In some implementations, the receive signal path of the RF circuitry 1006 can include mixer circuitry 1006A, amplifier circuitry 1006B and filter circuitry 1006C. In some implementations, the transmit signal path of the RF circuitry 1006 can include filter circuitry 1006C and mixer circuitry 1006A. RF circuitry 1006 can also include synthesizer circuitry 1006D for synthesizing a frequency for use by the mixer circuitry 1006A of the receive signal path and the transmit signal path. The UE 100 may utilize the RF circuitry 1006 and/or the FEM circuitry 1008 to receive data (e.g., on a PDSCH) comprising one or more MAC TBs from the base station 111.

Examples herein can include subject matter such as a method, means for performing acts or blocks of the method, at least one machine-readable medium including executable instructions that, when performed by a machine (e.g., a processor (e.g., processor, etc.) with memory, an application-specific integrated circuit (ASIC), a field programmable gate array (FPGA), or the like) cause the machine to perform acts of the method or of an apparatus or system for concurrent communication using multiple communication technologies according to implementations and examples described.

Example 1 is a baseband processor for a UE. The baseband processor comprises one or more processors configured to execute instructions stored in a memory to cause the UE to: monitor a memory backpressure associated with an application processor, and in response to the memory backpressure exceeding a first selective handling threshold, enter a selective medium access control (MAC) transport block (TB) handling mode, in which MAC TBs are handled based on a priority rule.

Example 2 comprises any variation of the subject matter of example 1, wherein the one or more processors further cause the UE to, while in the selective MAC TB handling mode: decode a first TB having a first data type in response to the first data type being in a set of prioritized data types, and drop a second TB having a second data type in response to the second data type not being in the set of prioritized data types.

Example 3 comprises any variation of the subject matter of example 2, wherein the set of prioritized data types includes MAC control elements (CEs), radio link control (RLC) control protocol data units (PDUs), and signaling radio bearer (SRB) traffic for radio resource control (RRC) and non-access stratum (NAS) layers.

Example 4 comprises any variation of the subject matter of example 3, wherein the one or more processors further cause the UE to: in response to the memory backpressure being greater than the first selective handling threshold and less than a second selective handling threshold, include high priority data radio bearer (DRB) traffic in the set of prioritized data types.

Example 5 comprises any variation of the subject matter of example 4, wherein the high priority DRB traffic includes one or more of: traffic associated with an internet protocol (IP) multimedia subsystem (IMS) bearer, traffic associated with an ultra-reliable low latency communications (URLLC) network slice, or traffic associated with a bearer receiving only transport control protocol (TCP) acknowledgement messages (ACKs) during a time window.

Example 6 comprises any variation of the subject matter of example 1, wherein the one or more processors further cause the UE to: in response to the memory backpressure falling below a default handling threshold, exit the selective MAC TB handling mode and enter a default MAC TB handling mode.

Example 7 comprises any variation of the subject matter of example 6, wherein the default handling threshold is less than the first selective handling threshold.

Example 8 comprises any variation of the subject matter of example 6, wherein the one or more processors further cause the UE to remain in a current MAC TB handling mode for a minimum threshold time measured from a most recent transition between MAC TB handling modes.

Example 9 comprises any variation of the subject matter of example 1, wherein the one or more processors further cause the UE to perform a radio resource control (RRC) connection release procedure in response to remaining in the selective MAC TB handling mode for greater than a maximum threshold time.

Example 10 is a baseband processor for a UE. The baseband processor comprises one or more processors configured to execute instructions stored in a memory to cause the UE to: monitor a memory backpressure, in response to the memory backpressure exceeding a first selective handling threshold, enter a selective medium access control (MAC) transport block (TB) handling mode, and while in the selective MAC TB handling mode: decode a first TB in response to the first TB having a first data type, and drop a second TB in response to the second TB having a second data type.

Example 11 comprises any variation of the subject matter of example 10, wherein the first data type comprises a MAC control element (CE) used for maintaining a radio resource control (RRC) connection of the UE.

Example 12 comprises any variation of the subject matter of example 10, wherein the second data type comprises a MAC control element (CE) indicating a recommended bit rate value.

Example 13 comprises any variation of the subject matter of example 10, wherein the one or more processors further cause the UE to: parse a logical channel (LCH) identity (ID) (LCID) of the first TB, wherein decoding the first TB is further in response to the LCID being a pre-defined LCID value.

Example 14 comprises any variation of the subject matter of example 13, wherein the pre-defined LCID value is one of LCID values 1, 2, or 3, corresponding to SRB1, SRB2, and SRB3 respectively.

Example 15 comprises any variation of the subject matter of example 10, wherein the first data type is a radio link control (RLC) protocol data unit (PDU), and wherein the one or more processors further cause the UE to parse the first TB using D/C bit in a header of the first TB in response to a logical channel (LCH) identity (ID) (LCID) of the first TB being associated with an acknowledged mode (AM) bearer.

Example 16 comprises any variation of the subject matter of example 10, wherein the second data type is one of high throughput user datagram protocol (UDP) traffic or high throughput file transport protocol (FTP) traffic.

Example 17 comprises any variation of the subject matter of example 10, wherein the one or more processors further cause the UE to transmit a hybrid automatic repeat request (HARQ) acknowledgement (ACK) message associated with the first TB.

Example 18 is a method to be performed by a UE. The method comprising: operating in a default medium access control (CE) transport block (TB) handling mode, in response to a memory backpressure exceeding a first selective handling threshold, entering a selective MAC TB handling mode, and while in the selective MAC TB handling mode: receiving data transmissions from a base station; and filtering the data transmissions based on a selective MAC TB handling rule that selectively accepts a first type of TBs and discards a second type of TBs.

Example 19 comprises any variation of the subject matter of example 18, wherein the selective MAC TB handling rule includes: accepting medium access control (MAC) control elements (CEs), radio link control (RLC) control messages, and signaling radio bearer (SRB) traffic for radio resource control (RRC) and non-access stratum (NAS) layers, and dropping application related traffic.

Example 20 comprises any variation of the subject matter of example 18, wherein the memory backpressure is associated with an application processor (AP) of the UE.

Example 21 comprises any variation of the subject matter of example 18, wherein the first type of TBs are associated with control data, and wherein the second type of TBs are associated with user data.

Example 22 comprises any variation of the subject matter of example 21, wherein the first type of TBs are used to maintain a connection with the base station during the selective MAC TB handling mode.

The above description of illustrated examples, implementations, aspects, etc., of the subject disclosure, including what is described in the Abstract, is not intended to be exhaustive or to limit the disclosed aspects to the precise forms disclosed. While specific examples, implementations, aspects, etc., are described herein for illustrative purposes, various modifications are possible that are considered within the scope of such examples, implementations, aspects, etc., as those skilled in the relevant art can recognize.

In this regard, while the disclosed subject matter has been described in connection with various examples, implementations, aspects, etc., and corresponding Figures, where applicable, it is to be understood that other similar aspects can be used or modifications and additions can be made to the disclosed subject matter for performing the same, similar, alternative, or substitute function of the subject matter without deviating therefrom. Therefore, the disclosed subject matter should not be limited to any single example, implementation, or aspect described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

As used herein, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items can be distinct, or they can be the same, although in some situations the context may indicate that they are distinct or that they are the same.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A baseband processor comprising:
one or more processors configured to execute instructions stored in a memory to:
monitor a memory backpressure associated with an application processor;
in response to the memory backpressure exceeding a first selective handling threshold, enter a selective medium access control (MAC) transport block (TB) handling mode, in which MAC TBs are handled based on a priority rule; and
perform a radio resource control (RRC) connection release procedure in response to remaining in the selective MAC TB handling mode for greater than a maximum threshold time.

2. The baseband processor of claim 1, wherein the one or more processors are further configured to:
while in the selective MAC TB handling mode:
decode a first TB having a first data type in response to the first data type being in a set of prioritized data types; and
drop a second TB having a second data type in response to the second data type not being in the set of prioritized data types.

3. The baseband processor of claim 2, wherein the set of prioritized data types includes MAC control elements (CEs), radio link control (RLC) control protocol data units (PDUs), and signaling radio bearer (SRB) traffic for radio resource control (RRC) and non-access stratum (NAS) layers.

4. The baseband processor of claim 3, wherein the one or more processors are further configured to:
in response to the memory backpressure being greater than the first selective handling threshold and less than a second selective handling threshold, include high priority data radio bearer (DRB) traffic in the set of prioritized data types.

5. The baseband processor of claim 4, wherein the high priority DRB traffic includes one or more of:
traffic associated with an internet protocol (IP) multimedia subsystem (IMS) bearer;
traffic associated with an ultra-reliable low latency communications (URLLC) network slice; or
traffic associated with a bearer receiving only transport control protocol (TCP) acknowledgement messages (ACKs) during a time window.

6. The baseband processor of claim 1, wherein the one or more processors are further configured to:
in response to the memory backpressure falling below a default handling threshold, exit the selective MAC TB handling mode and enter a default MAC TB handling mode.

7. The baseband processor of claim 6, wherein the default handling threshold is less than the first selective handling threshold.

8. The baseband processor of claim 6, wherein the one or more processors are further configured to remain in a current MAC TB handling mode for a minimum threshold time measured from a most recent transition between MAC TB handling modes.

9. A baseband processor of a user equipment (UE), the baseband processor comprising:
one or more processors configured to execute instructions stored in a memory to cause the UE to:
monitor a memory backpressure;
in response to the memory backpressure exceeding a first selective handling threshold, enter a selective medium access control (MAC) transport block (TB) handling mode; and
while in the selective MAC TB handling mode:
receive a first TB;
receive a second TB;
parse a logical channel (LCH) identity (ID) (LCID) of the first TB;
decode the first TB in response to the first TB having a first data type and the LCID of the first TB being a pre-defined LCID value; and
drop the second TB in response to the second TB having a second data type.

10. The baseband processor of claim 9, wherein the first data type comprises a MAC control element (CE) used for maintaining a radio resource control (RRC) connection of the UE.

11. The baseband processor of claim 9, wherein the second data type comprises a MAC control element (CE) indicating a recommended bit rate value.

12. The baseband processor of claim 10, wherein the pre-defined LCID value is one of LCID values 1, 2, or 3, corresponding to SRB1, SRB2, and SRB3 respectively.

13. The baseband processor of claim 9, wherein the first data type is a radio link control (RLC) protocol data unit (PDU), and wherein the one or more processors further cause the UE to parse the first TB using a data/control (D/C) bit in a header of the first TB in response to a logical channel (LCH) identity (ID) (LCID) of the first TB being associated with an acknowledged mode (AM) bearer.

14. The baseband processor of claim 9, wherein the second data type is one of:
high throughput user datagram protocol (UDP) traffic or high throughput file transport protocol (FTP) traffic.

15. The baseband processor of claim 9, wherein the one or more processors further cause the UE to transmit hybrid automatic repeat request (HARQ) acknowledgement (ACK) or negative acknowledgment (NACK) feedback for the first TB but not the second TB.

16. The baseband processor of claim 9, wherein the first data type includes TBs used to maintain a connection with a base station during the selective MAC TB handling mode, wherein the first TB and the second TB are received from the base station.

17. The baseband processor of claim 9, wherein the one or more processors further cause the UE to:

perform a radio resource control (RRC) connection release procedure in response to remaining in the selective MAC TB handling mode for greater than a maximum threshold time.

18. A method to be performed by a user equipment (UE), comprising:

operating in a default medium access control (MAC) transport block (TB) handling mode;

in response to a memory backpressure exceeding a first selective handling threshold, entering a selective MAC TB handling mode; and while in the selective MAC TB handling mode:

receiving data transmissions from a base station; and filtering the data transmissions based on a selective MAC TB handling rule that selectively accepts a first type of TBs and discards a second type of TBs, wherein the first type of TBs is associated with control data, wherein the second type of TBs is associated with user data, and wherein the first type of TBs is used to maintain a connection with the base station during the selective MAC TB handling mode.

19. The method of claim 18, wherein the selective MAC TB handling rule includes:

accepting medium access control (MAC) control elements (CEs), radio link control (RLC) control messages, and signaling radio bearer (SRB) traffic for radio resource control (RRC) and non-access stratum (NAS) layers; and dropping application-related traffic.

20. The method of claim 18, wherein the memory backpressure is associated with an application processor (AP) of the UE.

* * * * *